United States Patent
Ransom et al.

(10) Patent No.: US 11,501,344 B2
(45) Date of Patent: Nov. 15, 2022

(54) PARTIAL PERCEPTUAL IMAGE HASHING FOR INVOICE DECONSTRUCTION

(71) Applicant: Bottomline Technologies Limited, Reading (GB)

(72) Inventors: Mitchell Ransom, Reading (GB); Shane O'Hara, Louviers, CO (US)

(73) Assignee: Bottomline Technologies Limited, Reading (GB)

( * ) Notice: Subject to any disclaimer, the term of this patent is extended or adjusted under 35 U.S.C. 154(b) by 500 days.

(21) Appl. No.: 16/600,613

(22) Filed: Oct. 14, 2019

(65) Prior Publication Data
US 2021/0110447 A1    Apr. 15, 2021

(51) Int. Cl.
| | | |
|---|---|---|
| *G06Q 30/04* | (2012.01) | |
| *G06T 1/00* | (2006.01) | |
| *H04L 12/14* | (2006.01) | |
| *G06F 16/23* | (2019.01) | |
| *G06T 7/10* | (2017.01) | |

(52) U.S. Cl.
CPC ............. *G06Q 30/04* (2013.01); *G06F 16/23* (2019.01); *G06T 1/005* (2013.01); *G06T 7/10* (2017.01); *H04L 12/1428* (2013.01)

(58) Field of Classification Search
CPC ........... G06T 7/10; G06T 1/005; G06Q 30/04; G06F 16/23; H04L 12/1428; H04M 15/41; H04M 15/43; H04M 15/44; H04M 15/49; H04M 15/8033; H04W 4/24
See application file for complete search history.

(56) References Cited

U.S. PATENT DOCUMENTS

| | | |
|---|---|---|
| D704,209 S | 5/2014 | Russell et al. |
| 8,781,925 B1 * | 7/2014 | Stone ............... G06Q 40/00 705/40 |
| D757,054 S | 5/2016 | Starbuck et al. |
| D766,952 S | 9/2016 | Gedrich et al. |
| D774,052 S | 12/2016 | Gedrich et al. |
| D785,016 S | 4/2017 | Berwick et al. |
| D792,441 S | 7/2017 | Gedrich et al. |

(Continued)

FOREIGN PATENT DOCUMENTS

| | | | | |
|---|---|---|---|---|
| CN | 105956020 A | * | 9/2016 | ........... G06F 16/583 |
| CN | 107622278 A | * | 1/2018 | |

(Continued)

OTHER PUBLICATIONS

Takebe Hiroaki and Hotta Yoshinobu, "Document Image Retrieval Apparatus, Method and Program", published on Jun. 25, 2015, Document ID JP 2015118628A, p. 13 (Year: 2015).*

(Continued)

*Primary Examiner* — Chau T Nguyen
(74) *Attorney, Agent, or Firm* — Richard A. Baker, Jr.

(57) ABSTRACT

A system and method for deconstructing a document is described herein, where the method is an improvement over existing document deconstruction techniques. These improvements increase speed and accuracy by rapidly identifying the vendor in an invoice by splitting the invoice into three regions and performing a perceptual image hashing on each section. Then a hamming distance is used to compare the hash for each section with the hashes of known invoices to identify the vendor who sent the invoice.

17 Claims, 5 Drawing Sheets

(56) References Cited

U.S. PATENT DOCUMENTS

| | | | |
|---|---|---|---|
| 2010/0185615 A1 | 7/2010 | Monga | |
| 2017/0193329 A1* | 7/2017 | Suman | G06F 16/583 |
| 2019/0213462 A1* | 7/2019 | McDonald | G06Q 30/00 |
| 2020/0311898 A1* | 10/2020 | Hawke | G06F 16/583 |

FOREIGN PATENT DOCUMENTS

| | | | | |
|---|---|---|---|---|
| CN | 107657629 A | * | 2/2018 | |
| CN | 108241645 A | * | 7/2018 | G06F 16/583 |
| GB | 2582592 A | * | 9/2020 | G06F 16/55 |
| WO | 2015175824 A1 | | 11/2015 | |
| WO | 2018022157 A1 | | 2/2018 | |

OTHER PUBLICATIONS

Krawetz, N., "Looks Like It", 2011. Downloaded from from:http://www.hackerfactor.com/blog/index.php?/archives/432-Looks-Like-It.html on May 27, 2020.

www.wikipedia.com "Reverse image search", Sep. 12, 2019. Downloaded from: https://en.wikipedia.org/w/index.php?title=Reverse_image_search&oldid=915372427 on May 27, 2020.

Lada, Dr. Maria, "Combined Search and Examination Report", UK Intellectual Property Office, dated May 18, 2020.

Holt, Xavier and Andrew Chisholm, "Extracting structured data from invoices", Proceedings of Australasian Language Technology Association Workshop, 2018, pp. 53-59.

Segers, Jens, "Perceptual image hashes", Dec. 13, 2014, webpage downloaded from https://jenssegers.com/perceptual-image-hashes on Sep. 27, 2019.

Sypht, "Unlock the value of your information", webpage downloaded from https://www.sypht.com/index.html on Sep. 27, 2019.

Bottomline Technologies (de), Inc, "4 Steps to Bringing a Positive ROI to Accounts Payable", 2019, a white paper downloaded from https://go.bottomline.com/rs/498-XVR-738/images/4-Steps-Bringing-Positive-ROI-AP-IOFM-FDX-US-WTP-1802-088.pdf on Sep. 30, 2019.

Ephesoft, "KV Extraction Normalization", webpage downloaded from https://ephesoft.com/docs/2019-1/moduleplugin-configuration/extraction-module/key-value-extraction-4040/key-value-extraction-plugin/kv-extraction-normalization/ on Oct. 1, 2019.

* cited by examiner

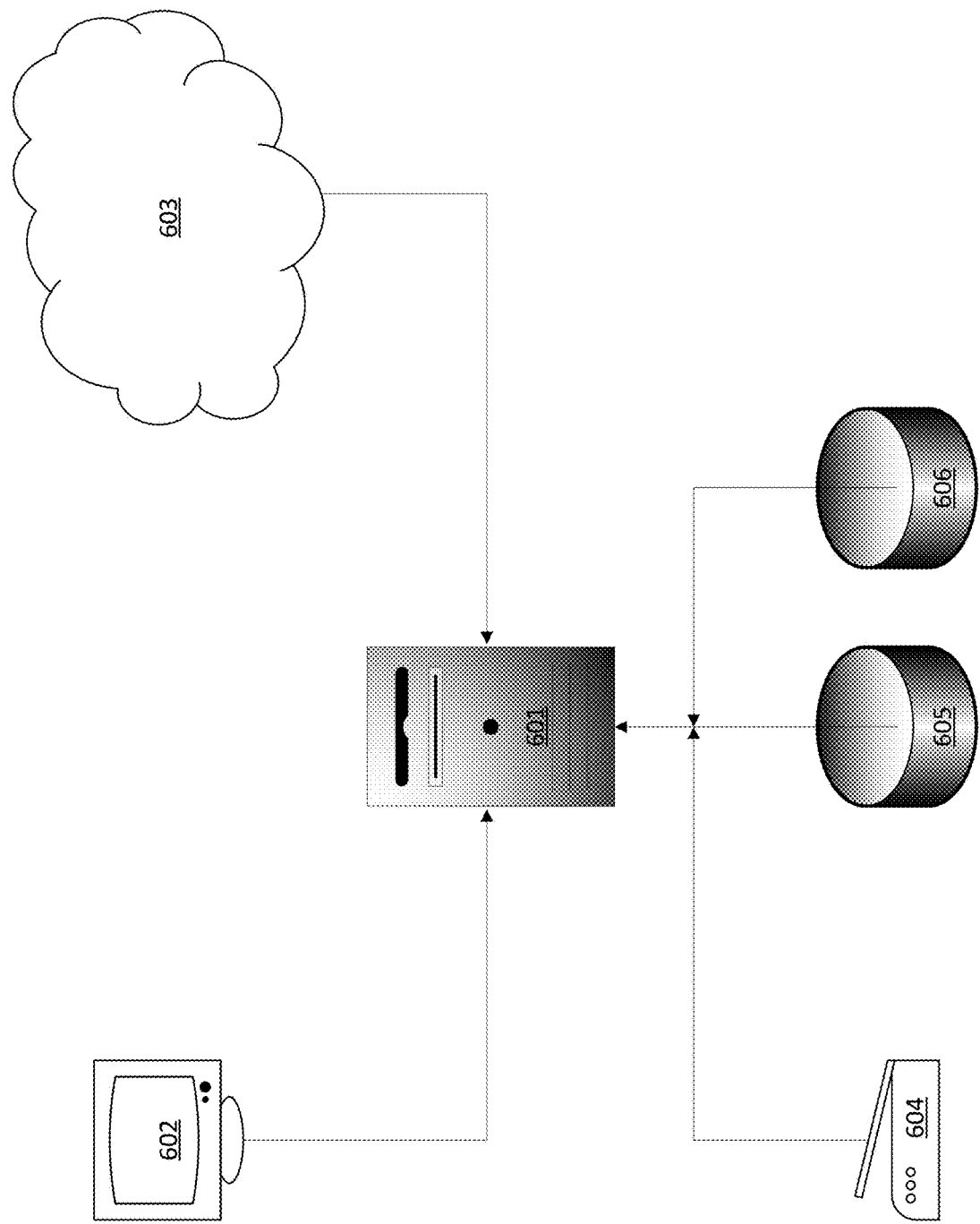

PARTIAL PERCEPTUAL IMAGE HASHING FOR INVOICE DECONSTRUCTION

PRIOR APPLICATION

This is a priority application.

BACKGROUND

Technical Field

The present disclosure relates generally to electronic document deconstruction and more particularly to the use of perceptual image hashing for electronic document deconstruction.

Description of the Related Art

In today's electronic world, there are still a number of documents that are transmitted via paper or bitmapped images. Particularly in an accounting department, where thousands of images of receipts or invoices may be received each month. Each receipt or invoice is in a company specific format, with unique locations for specific pieces of information. The specific information is needed for loading in an accounts payable software system. Ideally, the invoice could be sent as an XML file with the fields populated by the accounts receivable software. But this rarely happens; instead the invoices often arrive in paper form.

Automation improves processes and reduces costs by eliminating the data entry, PO matching, paper handling and routing, and physical document storage required in a manual or semi-automated environment. The technology automatically extracts and validates invoice data, matches invoices with POs and proof-of-delivery receipts, and posts approved invoices directly into an ERP platform 606. Any invoices that require review, approval or exceptions resolution are electronically routed to specific individuals based on pre-configured rules. Dashboards automatically alert managers to bottlenecks and users to invoices approaching their due-date. The technology also tracks key productivity metrics. And accounts payable no longer needs to pay fees on multiple bank systems to pay suppliers.

Compared to manually processing paper invoices, automation typically delivers cost savings between 60 percent and 80 percent, per the Billentis 2016 E-Billing/EInvoicing Report. A major driver of these cost savings is the fact that highly automated accounts payable organizations can process approximately 17 times as many invoices annually per employee than their peers that rely on manual invoice processes, per IOFM's 2017 AP Benchmark Study. In fact, one-third of invoice sub-processes—and their associated costs—can be removed through automation without losing anything essential, per the Billentis 2016 E-Billing/E-Invoicing Report. For instance, electronic invoices virtually eliminate the costs associated with receiving invoices, capturing invoice data, and coding general ledger information. Validating invoice data and matching invoices to purchase orders and/or proof-of-delivery documents costs more than two-thirds less in an automated environment compared to a manual environment, managing invoice disputes costs 20 percent less, managing payments and cash costs less than half as much, and archiving invoices and related documents costs nearly two-thirds less, Billentis notes.

Invoice automation also delivers indirect savings such as reduced paper and postage expenses, fewer supplier inquiries, and fewer redundancies and inaccuracies in the vendor master database 605.

In an automated environment, invoice data can be validated in real-time or near-time. Exceptions can be resolved in a structured, digital fashion that combines configurable business rules for routing exceptions, online collaboration between internal stakeholders and suppliers, and annotations.

Based on the IOFM and AIIM benchmarks for invoice processing costs, an accounts payable department that processes 5,000 invoices per month stands to save $55,650 per month (8,850 per month versus $64,500 per month) and $667,800 annually through accounts payable automation. Even greater ROI is possible when you factor in earning rebates on electronic payments.

But even in a fully automated environment, the time to analyze each invoice can be extensive. Simply identifying the vendor can be computationally intensive, with vendors using logos or fancy fonts in their headers or footers. Simple Optical Character Recognition do not work well with logos and fancy fonts. A better, faster system is needed for automating invoice and receipts. The present inventions resolves this issue with an improved, faster, and more reliable invoice processing solution.

SUMMARY OF THE INVENTIONS

An apparatus for identifying a vendor associated with an invoice is described herein. The apparatus is made up of a special purpose processor with a plurality of cores, a memory electrically connected to the special purpose processor, and a mass storage device holding a database of known vendors, the mass storage device electrically connected to the special purpose processor. An image of the invoice stored in the memory is split into a plurality of regions by the special purpose processor. A perceptual image hash is calculated by the special purpose processor for each of the plurality of regions of the invoice, and a hamming distance is calculated between the perceptual image hash of each of the plurality of regions and for each entry in the database of known vendors for each of the plurality of regions. The vendor associated with the smallest hamming distance is identified as the vendor associated with the invoice.

The perceptual image hash could be calculated with an average algorithm, a difference algorithm or a pHash algorithm. The invoice could be reduced to an eight by eight grid of pixels before calculating the perceptual image hash. The invoice could be reduced to grayscale color before calculating the perceptual image hash. The plurality of regions could consist of three regions. The smallest hamming distance could be compared to a threshold and the vendor associated with the smallest hamming distance could be added to the database of known vendors if the smallest hamming distance is greater than the threshold. The vendor that is identified could be the newly added vendor.

A method for identifying a vendor associated with an invoice is described herein. The method is made up of the steps of (1) splitting an image of the invoice stored in a memory into a plurality of regions by a special purpose processor with a plurality of cores, wherein the memory is electrically connected to the special purpose processor, (2) calculating a perceptual image hash by the special purpose processor for each of the plurality of regions, (3) calculating a hamming distance between the perceptual image hash of each of the plurality of regions and for each entry in a database of known vendors for each of the plurality of regions, and (4) identifying the vendor associated with the smallest hamming distance as the vendor associated with the invoice. The mass storage device holds the database of known vendors, the mass storage device electrically connected to the special purpose processor.

BRIEF DESCRIPTION OF THE DRAWINGS

The annexed drawings, which are not necessarily to scale, show various aspects of the inventions in which similar reference numerals are used to indicate the same or similar parts in the various views.

FIG. 6 is a diagram of the equipment for one embodiment.

DETAILED DESCRIPTION

Figures 1, 2:
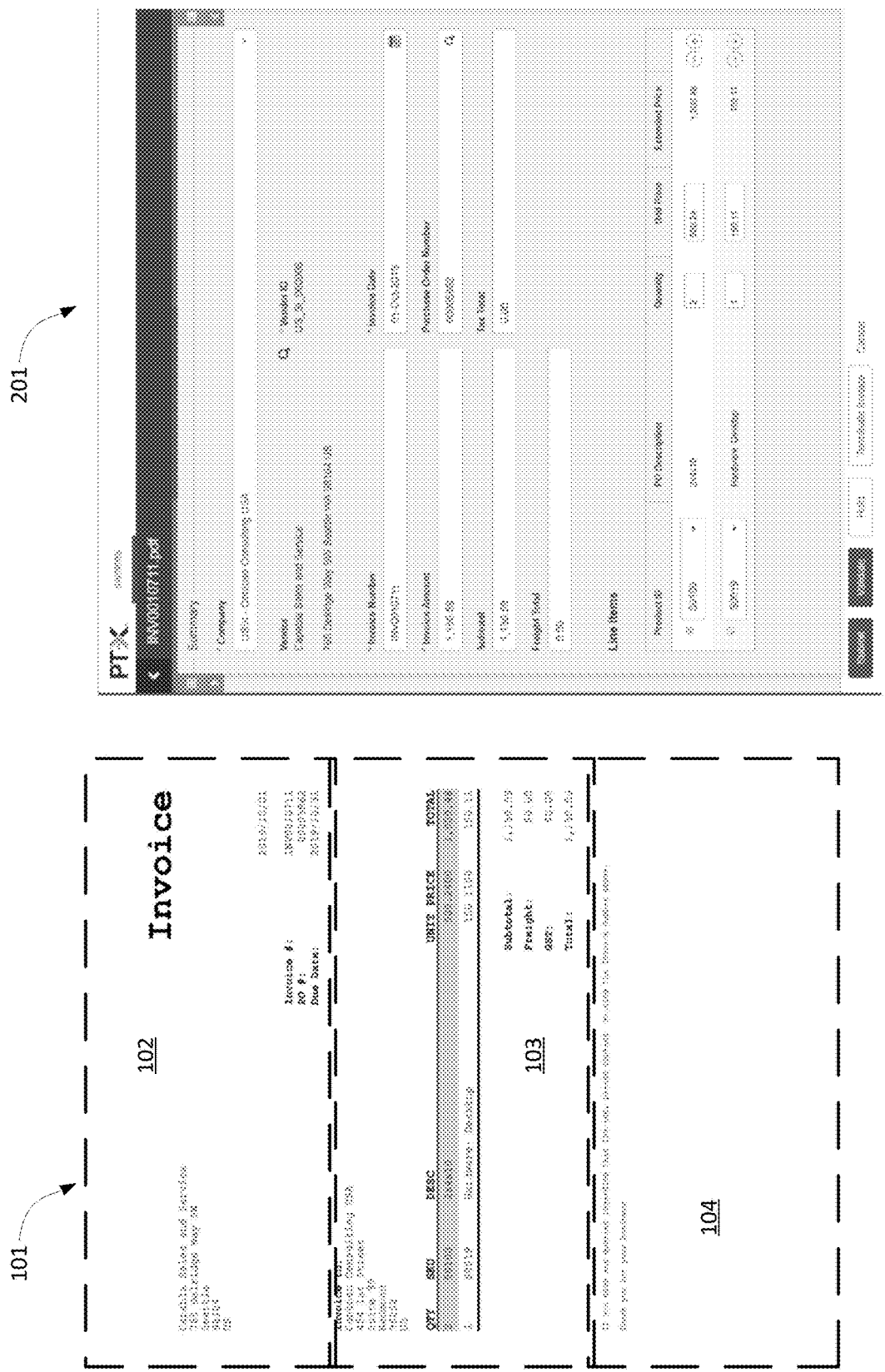
FIG. 1 is a sample invoice split into three sections.
FIG. 2 is a list of the contents of the invoice from FIG. 1 as deconstructed and loaded into an accounts payable software package.

The present disclosure is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

FIGS. 1 and 2 show an invoice 101 and the results of its deconstruction and insertion of the data into an accounts payable software system screen 201. A careful view of the two figures shows that the same data on the physical invoice image 101 is displayed on the software 201.

The general process of deconstructing a document such as a receipt or an invoice is to first obtain an electronic copy of the document, either through scanning a paper copy, receiving an email, or uploading an electronic copy. Typically, this electronic image is then converted into a portable document format (PDF) file. Then optical character recognition (OCR) is performed on the document, if the text cannot be directly extracted from the PDF data, and the vendor is identified, but the order of these tasks could be reversed. Next, the vendor information is used to assist in the extraction of the various header fields in the document, followed by the line extraction to capture the table information on each itemized line of the invoice, and the extracted data is loaded into invoice processing software. While we describe an invoice in this document, these techniques could be used for other types of structured documents such as receipts, patent documents, checks, drug prescriptions, medical records, government forms, etc.

Vendor Identification

The vendor information could be determined based on information in an email, PDF metadata fingerprinting, an intelligent data match, or Perceptual image hashing.

Email

The first task in invoice deconstruction is the identification of the vendor. There are a number of techniques that can be used to rapidly determine the vendor who sent the invoice. Some invoices are sent by email directly from the vendor to the capture portal, we can then use a combination of the "from" address and "to" address to match to a specific vendor. Similarly, a FAX document may have the header or phone number available for lookup. However, few invoices are FAXed anymore, and emailing of invoices is far from ubiquitous.

Intelligent Data Match

In another embodiment, the algorithm iterates through enterprise resource planning ("ERP") data in the database 606 to search the PDF text, after optical character recognition is completed, for exact matches on address data, telephone numbers, email addresses etc. This is quite inefficient, as up to 40,000 database records may be loaded and the text searched across the entire PDF document up to 100,000 times in cases where no vendor was found.

PDF Metadata Fingerprinting

Extracting the metadata of a PDF such as the author, producer, creator, title and subject and combining them to find a unique match to a specific vendor. This metadata is readily available in some PDF files, and could be extracted quickly and used to find the proper vendor record in the ERP system 606. But the metadata is not available for scanned documents or bit mapped documents. It is only available if the vendor itself created the PDF document, properly set the PDF document metadata, and did not clean the metadata from the PDF document before sending.

Perceptual Image Hashing (Vendor Resolution)

Perceptual image hashing is technique that provides an efficient method for identifying vendors in a wide range of document formats. Looking to FIG. 1, the invoice is split into three sections, one for the top 15-20% 102, another section for the middle of the invoice 103, and a third section for the bottom 15-20% 104. While this embodiment uses three sections, any number of sections could be used in other embodiments. The current embodiment uses 15-20% of the invoice for the top and bottom sections; these sections could be any size without detracting from the inventions described herein. The general idea is to capture the header 102 and footer 104 of the invoice 101, the areas of the invoice likely to have identifying marks that can be used to identify the vendor.

For rasterized PDFs (usually a physical document scanned to PDF), convert the PDF into a PNG file, take the top 15-20% of the page (header) 302 and the bottom 10-15% of the page (footer) 302 and generate a perceptual image hash 303 of the two images combined, use this hash to then compare the similarity to historic hashes of other documents 304. Due to the similar nature of all invoices, in one embodiment, there would need to be a very high similarity score (90%+) to consider a match and there should also be no other matches within 10%+, for instance if the top result is 92% and the 2nd result is 87% and both point to different vendors then we would not consider this as a match.

For non-rasterized PDFs, extract all images and hash them, compare the hashes to historic hashes looking for matches, as we can't identify the actual logo image on the PDF, special consideration is needed for images that may be common across vendors, i.e. industry scheme logos or vendors belonging to the same parent company etc. in these cases we ignore any hash search that returns multiple vendors and only look for matches that return a single vendor, we may search the hashes of 5 images found on the PDF and only find a unique vendor match for 1 image, this is OK. See also U.S. Pat. No. 10,282,129, "Tenant aware, variable length deduplication of stored data" by Andy Dobbels and Zenon Buratta for further information on the processing of non-rasterized PDFs, said patent incorporated herein by reference.

Figure 3:
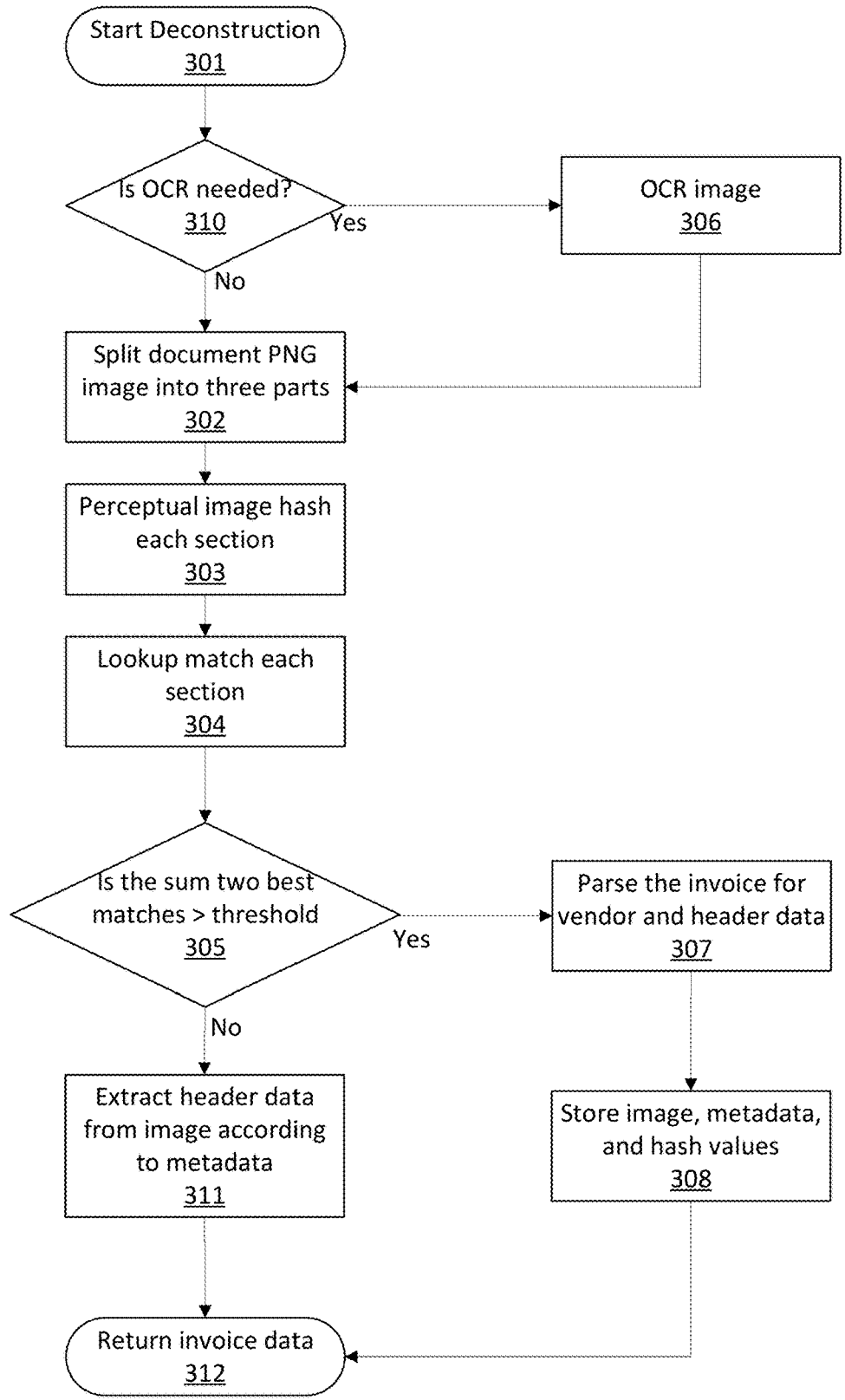
FIG. 3 is a high level flow chart of the invoice image deconstruction.

Looking to FIG. 3, the process of deconstruction begins 301 by receiving the image of the invoice 101. First, the image is OCRed 306 if needed 310. The image is then converted into a PNG file and split into three parts 302, 102, 103, 104, with the top and bottom representing 15-20% of the document, and the middle comprising 60-70% of the document. This is to isolate the header and footer on the idea that the header and footer contain logos or text that identify the vendor.

A perceptual image hash 303 is next calculated for each of the three sections 102, 103, 104. Then a database 605 of known vendors is searched for a match, comparing the top section hash with the hashes of other top sections, similarly comparing the middle and bottom sections. In order for this search to handle imperfections, a hamming distance calculation is performed on each comparison, and the closest matches are identified.

```
Function BestMatch (TopPiHash, MiddlePiHash, BottomPiHash)
For (i=0; i < CountOfRecords; i++)
{
  HdTop = HammingDistance(TopPiHash, PiRecords[i][TOP];
  HdMiddle = HammingDistance(TopPiHash, PiRecords[i][MIDDLE];
  HdBottom = HammingDistance(TopPiHash, PiRecords[i][BOTTOM];
  If (HDTop > BestHDTop)
  {
      BestHDTop = HDTop;
      BestTop = I;
  }
  If (HDMiddle > BestHDMiddle)
  {
      BestHDMiddle = HDMiddle;
      BestMiddle = I;
  }
  If (HDBottom > BestHDBottom)
  {
      BestHDBottom = HDBottom;
      BestBottom = I;
  }
}
Return BestTop, BestMiddle, BestBottom;
```

In FIG. 3, the next step is to compare the results of the lookup to a threshold 305. Typically, this will be a comparison of the top and bottom matches to see if the hamming distance of the match is less than a threshold for the sum of the top and bottom. Again, the focus is on the location where the vendor identity is most likely found. But the algorithm also check for the combination of the top and middle or bottom and middle to see if this invoice has placed information in an unusual location.

If the sum of the best two hamming distances is greater than the threshold, then the invoice 101 does not match the database 605 of know vendors, then the vendor on the invoice needs to be added to the database 605 of known vendors. This process begins extracting the relevant data 307 from the invoice. See FIG. 5 for more details on the extraction of the data. In addition to the data extraction, metadata is also collected regarding where the data was found. For instance, the invoice date is found about 15% of the way down on the right side of the invoice in FIG. 1, and the invoice number is directly below, the PO number is below the invoice number, and the due date is below the PO number. This metadata on the location of certain fields is stored with the image and the hash values 308 in the database 605 of known vendors. The data is pulled from the invoice according to the information in the metadata 311, and returned 312. Once returned 312, the data is likely sent to ERP software.

If the sum of the best two hamming distances is less than or equal to the threshold, then the invoice 101 is a match to a vendor in the database 605 of know vendors. The algorithm then knows where to look for the various fields, based on the metadata in the database 605 of known vendors. The and the header data is pulled from the invoice according to the information in the metadata 311 and returned 312. Once returned 312, the data is likely sent to ERP software.

Figure 4:
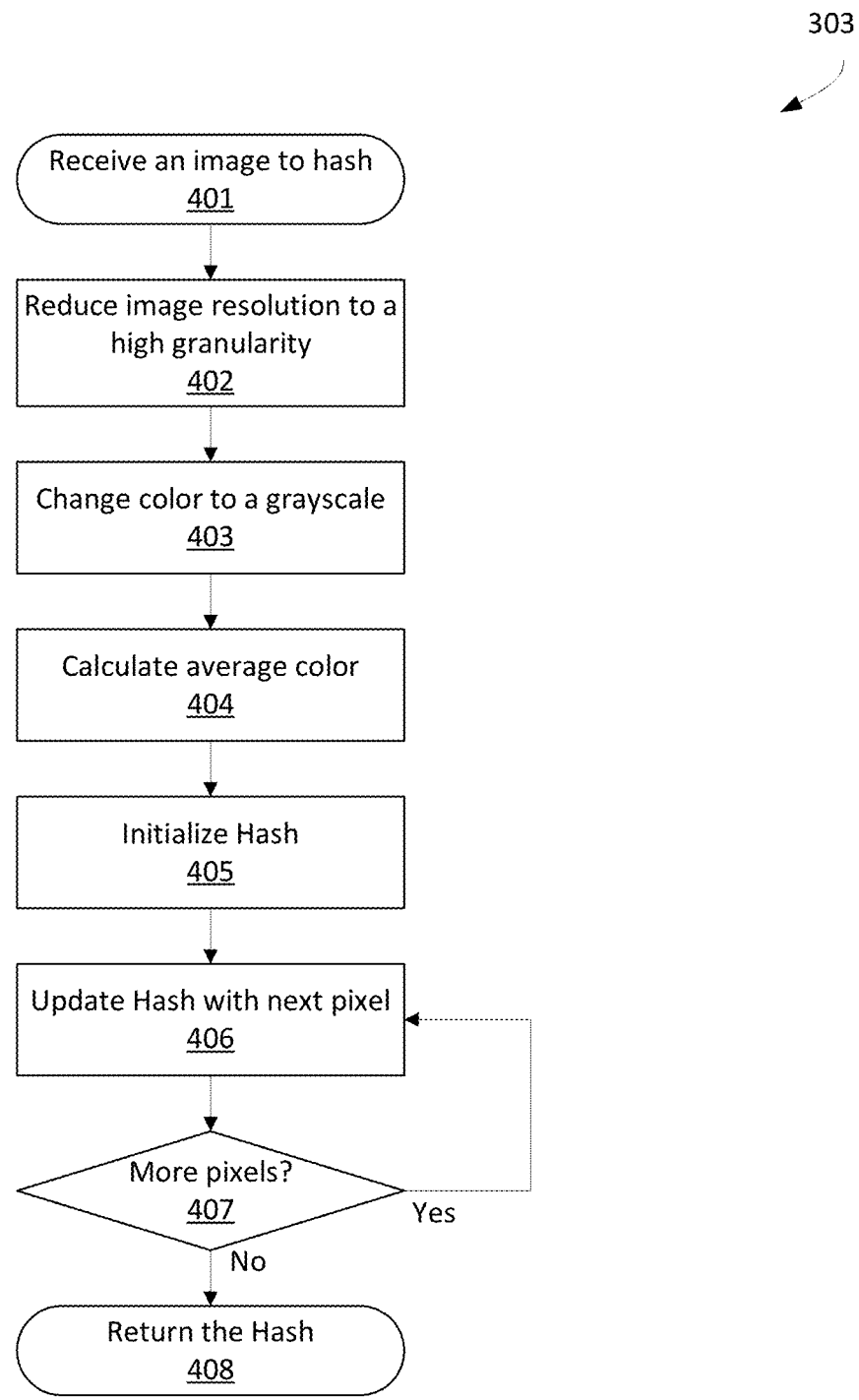
FIG. 4 is a detailed flow chart of the perceptual image hash algorithm.

Perceptual hashes, as seen in FIG. 4, are a completely different concept compared to the usual cryptographic hashing methods such as MD5 or SHA. With cryptographic hashes, a one-way digest is generated based on the input data. And because of its avalanche effect, the resulting hash is completely different when you change a single bit:

md5("10100110001")=
  50144bd388adcd869bc921349a287690
md5("10100110101")=
  3e3049b1ed21ede0237f9a276ec80703

Because of this, the only way 2 images have the same cryptographic hash, is when they are exactly the same. This makes cryptographic hashing not a feasible solution to solve this problem.

In contrast, a perceptual hash is a fingerprint based on the image input that can be used to compare images by calculating the hamming distance (which basically means counting the number of different individual bits).

A hamming distance between two 64 bit values can be calculated as follows:

```
int hamming_distance(unsigned long64 x, unsigned long64 y)
{
  int dist = 0;
  for (unsigned long64 val = x ^ y; val > 0; val /= 2)
  {
    if (val & 1)
      dist++;
  }
  // Return the number of differing bits
  return dist;
}
```

There are a couple of different perceptual image hashing algorithms, but they all use similar steps for generating the media fingerprint. The easiest one to explain is the Average Hash (also called aHash). This function starts 401 with the receipt of an image to hash, and corresponds to the perceptual image hash 303.

First, the size of the image is reduced 402 to 8×8 pixels (other embodiments could use other dimensions). This is the fastest way to remove high frequencies and details. This step ignores the original size and aspect ratio, and will always resize to 8×8 so that we have 64 resulting pixels. The resizing could reduce the size by splitting the image into 64 sections (8×8) and averaging the pixel values within each of the 64 sections.

Now that we have 64 pixels, each with their RGB value, reduce the color by converting the image to grayscale 403. This will leave us with 64 greyscale values.

Then the average color 404 is calculated by averaging the 64 pixel values.

Next, the hash is calculated. The hash calculation begins by initializing the hash 405 to zero. Then the hash is calculated based on whether a pixel is brighter or darker than the average grayscale value we just calculated 406. Do this for every pixel 407 and you end up with a 64 bit hash. The aHash function 406 could use the x86 processor instruction AES, or use the following algorithm:

Hash128=Long128(Hash XOR (pixel[x]−AverageColor))*PRIME_CONSTANT;

Hash=(Hash128>>64)+(Hash128 AND 0xFFFFFFFF);

In other words, the new data is XORed with the current Hash, and the resulting value is converted to a 128 bit number (with the upper 64 bits zeros). The resulting value is multiplied by a constant (A safe prime), and the resulting upper 64 bits are added to the resulting lower 64 bits and stored as the new Hash. This Hash value is then returned 408.

Comparing Images

To detect duplicate or similar images, calculate the perceptual hashes for both images. Look at an example and its thumbnail.

Original: 1100100101101001001111000001100000010000000000000000011100111111
Thumbnail: 1100100101101001001111000001100000010000000000000000011100111111

As can be seen, both hashes are identical. But this doesn't mean that similar images will always create equal hashes. If we manipulate the original image, and add a watermark, we get these hashes:

Original: 110010010110100100111100000110000000100000000000000000011100111111
Watermark: 1100100101111001001111000001100000011000000010000000011100111111

As you can see, these hashes are very similar, but not equal. To compare these hashes, we count the number of different bits (the Hamming Distance), which is 3 in this case. The higher this distance, the lower the chance of identical or similar images.

The Average Hash (aHash) implementation is the easiest to implement and the fastest algorithm. Two other implementations are Difference Hash (or dHash) and pHash.

Difference Hash follows the same steps as the Average Hash, but generates the fingerprint based on whether the left pixel is brighter than the right one, instead of using a single average value. Compared to Average Hash, the dHash algorithm generates fewer false positives.

pHash is an implementation that is quite different from the other ones, and increases the accuracy with its complexity. pHash resizes the image to a 32×32 image, calculates the Luma (brightness) value of each pixel and applies a discrete cosine transform (DCT) on the matrix. It then takes the top-left 8×8 pixels, which represent the lowest frequencies in the picture, to calculate the resulting hash by comparing each pixel to the median value. Because of the pHash algorithm's complexity it is also the slowest option.

Header Extraction

Figure 5:
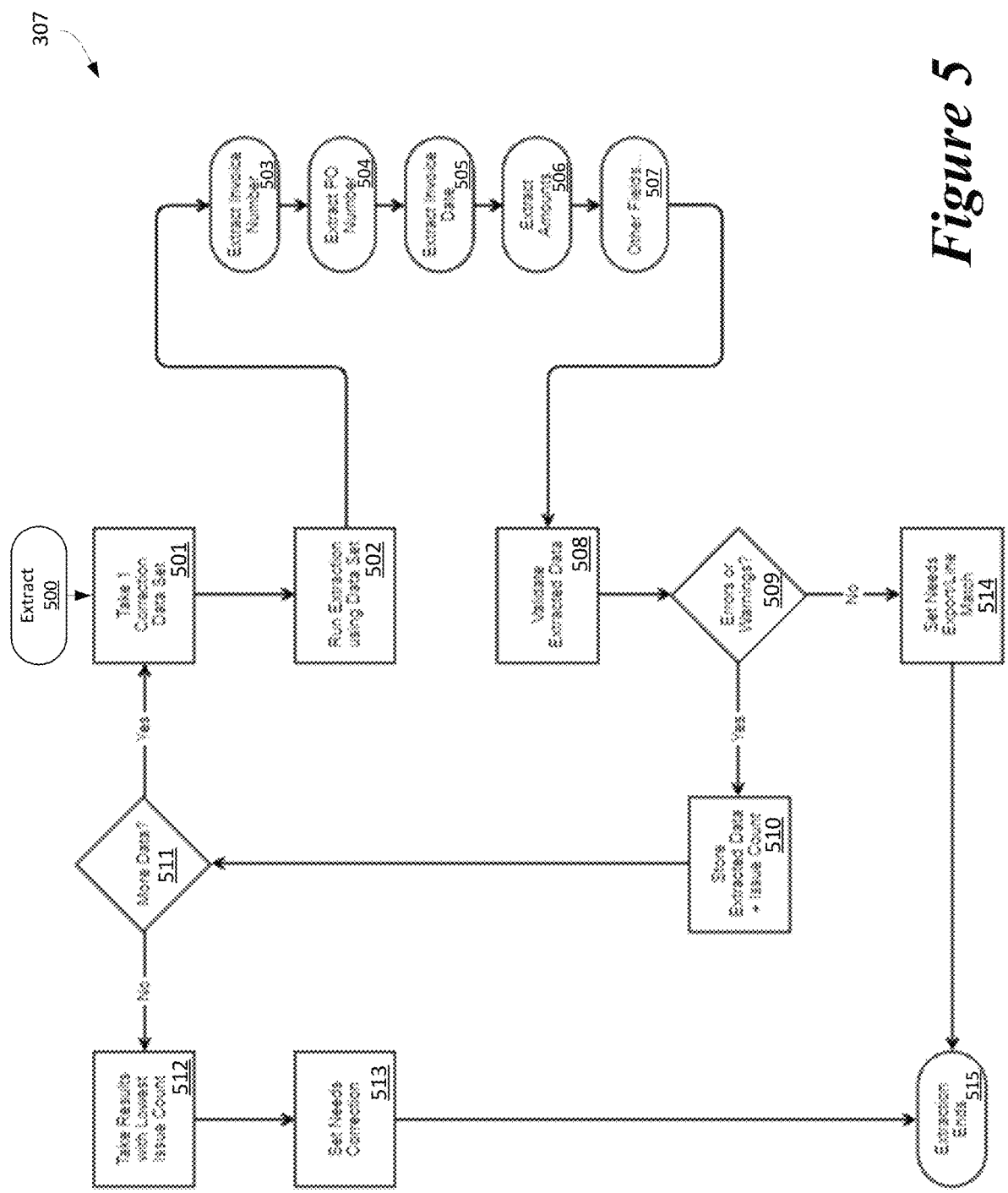
FIG. 5 is a flow chart of the data extraction process.

Once the vendor has been identified with the above technique, the header of the invoice is deconstructed using the intelligent data extraction or header learning techniques, as outlined in FIG. 5.

IDE (Intelligent Data Extraction)

Using positional biases, based on research, we can assume likely locations of specific fields, invoice number top right of first page, invoice amount bottom right of last page etc. The validation biases, invoice date cannot be a future date, it is also likely to be the date closest to the current date in comparison to other dates found. Similarity biases, once the vendor is known then string similarity is used to compare invoice number candidates to previous invoice numbers for that vendor, sequences are likely such as INV0001, INV0002, INV0003 etc. This information is stored in the metadata section of the known vendor database 605.

First, determine the common character sequence across previous invoice numbers (INV000), check current candidate starts with this sequence. If no common character sequence can be found, use Levenstein distance algorithm (or similar depending on further testing and research) to compare current candidate to previous invoice numbers. If similarity algorithm is inconclusive, use pattern matching based on sequence of character types, i.e. AAADDDD (should only be used where the value is not an entire sequence of 1 character type).

Expected data bias, for Purchase Order Number in particular, we have access to all purchase order numbers, filtered by vendor and status a match to any of the available POs assumes a perfect match.

The current label extraction search used is based on technology referred to as KV Extraction. KV Extraction uses regular expressions (Regex) to find a label and then looks in a configured direction to find a value. In KV Extraction, the top result is determined by configured weighting on each regex based rule and each rule only extracts a single result. In the IDE technique, all possible candidates are extracted and then the positional, validation and similarity biases are applied to increase the confidence of each candidate, the candidate with the highest confidence at the end of this process is the value extracted.

Header Learning

FIG. 5 shows the header learning extraction technique 307. The extraction 500 starts with a first take on the data set 501. The data is extracted 502 by looking for labels such as "Invoice Number:" "Invoice #:" (and many more) using a series of regex expressions. For each label found, look for text to the right and below the label for anything that could be an invoice number (essentially any alphanumeric string). For each candidate found, we then apply a series of "rules" that modify the confidence of the candidate. For example, the likelihood to be top right, the likelihood to be top 40% of the page, the likelihood ely to have only uppercase characters, the likelihood to be greater than 50% numeric characters, the unlikelihood to have any whitespace, the unlikelihood to have non alphanumeric characters.

If vendor is known, check the likelihood that the invoice number is similar to previous invoice numbers for that vendor, i.e. (INV0001, INV0002, INV0003). When taking the numeric value of previous invoice numbers from that vendor (1, 2, 3) likelihood that the current invoice number will have a higher numeric value than the last invoice from that vendor.

Once all candidates are analyzed, we then select the candidate with the highest confidence.

This process is used to extract the invoice number 503, the PO number 504, the invoice data 505, the amounts 506, and the other fields 507. Once all of the data is extracted, the data is validated 508 to see the data makes sense. For instance, check that the date fields contain a date near to the current date and that the PO number matches an existing purchase order for the particular vendor. If there are errors or warnings 509, then store the extracted data and the number of issues in a variable 510 and search for more data 511 to analyze. If there is more data, restart the process with the correction data set 501.

If there is no more data 511, take the results with the lowest issue count 512, and set the "needs correction" flag 513 before ending the extraction process 515.

If there are no errors or warnings 509, prepare for a line match 514, and end the extraction 515.

Line Item Capture

To capture each line of the invoice table section, search for the location of a header row, best candidate matches the most column headers (Item Code, Quantity, Description, Unit Price, Extended Price) on single line of text. Scanning down the PDF starting from below the header row and until total/subtotal is found, analyze each line of text to identify key fields. If a column header is missing, we can identify the most likely value based on different criteria and a process of elimination; for instance Quantity×Price=Line Total will provide validation for the row. The context from the purchase order can be used to identify values based on the data expected to be present. This is especially relevant to item code.

Hardware

The electrical components required to operate the functionality described herein are special purpose devices that need to have the facilities to operate the above algorithms. Looking to FIG. 6, we see a special purpose, multi-core server processor 601 with a large memory (perhaps 56 GB, in some embodiments) RAM for rapidly processing the OCR functionality and running the image processing operations. The server is electrically connected to a scanner device 604, a computer monitor 602, and the internet 603. In addition, the processor 601 is electrically or optically connected to one or more mass storage devices containing a known vendor database 605 and an ERP database 606. In some embodiments, the ERP database 606 is connected to a different server and may be located remotely from the server 601.

It should be appreciated that many of the elements discussed in this specification may be implemented in a hardware circuit(s), a circuitry executing software code or instructions which are encoded within computer readable media accessible to the circuitry, or a combination of a hardware circuit(s) and a circuitry or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a circuitry or control block executing code encoded in a computer readable media, or a combination of a hardware circuit(s) and a circuitry and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the inventions have been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the inventions. In addition, while a particular feature of the inventions may have been described above with respect to only one or more of several illustrated embodiments, such feature may be combined with one or more other features of the other embodiments, as may be desired and advantageous for any given or particular application.

The invention claimed is:

1. An apparatus for identifying a vendor associated with a new invoice, the apparatus comprising:
    a special purpose processor with a plurality of cores;
    a memory electrically connected to the special purpose processor; and
    a mass storage device holding a database of known vendors, the mass storage device electrically connected to the special purpose processor, wherein each known vendor in the database includes a known vendor image hash for each of a plurality of sections of a known vendor invoice;
    wherein an image of the new invoice stored in the memory is split into three sections by the special purpose processor,
        a perceptual image hash is calculated by the special purpose processor for each of the three sections of the new invoice, and
        a hamming distance is calculated between the perceptual image hash of at least one of the three sections of the new invoice and each entry in the database of the known vendors for the corresponding section of the known vendor invoice, the known vendor associated with a smallest hamming distance identified as the vendor associated with the new invoice.

2. The apparatus of claim 1 wherein the perceptual image hash is calculated with an average algorithm.

3. The apparatus of claim 1 wherein the perceptual image hash is calculated with a difference algorithm.

4. The apparatus of claim 1 wherein the perceptual image hash is calculated with a pHash algorithm.

5. The apparatus of claim 1 wherein the new invoice is reduced to an eight by eight grid of pixels before calculating the perceptual image hash.

6. The apparatus of claim 1 wherein the new invoice is reduced to grayscale color before calculating the perceptual image hash.

7. The apparatus of claim 1 wherein the plurality of regions consists of three regions.

8. The apparatus of claim 1 wherein the smallest hamming distance is compared to a threshold and the vendor associated with the smallest hamming distance is added to the database of the known vendors if the smallest hamming distance is greater than the threshold.

9. The apparatus of claim 8 wherein the vendor that is added is identified as the vendor associated with the new invoice.

10. A method for identifying a vendor associated with a new invoice, the method comprising:
    splitting an image of the new invoice stored in a memory into three sections of the new invoice by a special purpose processor with a plurality of cores, wherein the memory is electrically connected to the special purpose processor;
    calculating a perceptual image hash by the special purpose processor for each of the three sections of the new invoice;
    calculating a hamming distance between the perceptual image hash of at least one of the three sections of the new invoice and for each entry in a database of known vendors for the corresponding section; and identifying the known vendor associated with a smallest hamming distance as the vendor associated with the new invoice;

wherein a mass storage device holds the database of the known vendors, the mass storage device electrically connected to the special purpose processor.

11. The method of claim 10 wherein the perceptual image hash is calculated with an average algorithm.

12. The method of claim 10 wherein the perceptual image hash is calculated with a difference algorithm.

13. The method of claim 10 wherein the perceptual image hash is calculated with a pHash algorithm.

14. The method of claim 10 further comprises reducing the new invoice to an eight by eight grid of pixels before calculating the perceptual image hash.

15. The method of claim 10 further comprises reducing the new invoice to grayscale color before calculating the perceptual image hash.

16. The method of claim 10 further comprises comparing the smallest hamming distance to a threshold and adding the vendor associated with the smallest hamming distance to the database of the known vendors if the smallest hamming distance is greater than the threshold.

17. The method of claim 16 wherein the vendor that is added is identified as the vendor associated with the new invoice.

\* \* \* \* \*